US008837003B2

(12) United States Patent
Yabe (10) Patent No.: US 8,837,003 B2
(45) Date of Patent: Sep. 16, 2014

(54) IMAGE PROCESSING APPARATUS AND METHOD FOR CONVERTING A COLOR IMAGE INTO A MONOCHROME IMAGE

(75) Inventor: Takashi Yabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 12/922,404

(22) PCT Filed: Jul. 1, 2010

(86) PCT No.: PCT/JP2010/004341
§ 371 (c)(1),
(2), (4) Date: Sep. 13, 2010

(87) PCT Pub. No.: WO2011/004570
PCT Pub. Date: Jan. 13, 2011

(65) Prior Publication Data
US 2011/0122427 A1 May 26, 2011

(30) Foreign Application Priority Data

Jul. 10, 2009 (JP) ................................ 2009-163922

(51) Int. Cl.
*H04N 1/40* (2006.01)
*H04N 1/23* (2006.01)
*H04N 1/00* (2006.01)

(52) U.S. Cl.
CPC ........... *H04N 1/40012* (2013.01); *H04N 1/233* (2013.01); *H04N 1/2338* (2013.01); *H04N 1/2307* (2013.01); *H04N 1/2369* (2013.01); *H04N 1/00867* (2013.01); *H04N 1/00854* (2013.01); *H04N 1/0084* (2013.01); *H04N 1/0087* (2013.01)
USPC ............ 358/3.28; 358/1.9; 358/2.1; 358/470; 382/100; 382/162; 382/167

(58) Field of Classification Search
CPC .............. H04N 1/0087; H04N 1/2338; H04N 1/40012; H04N 1/00867; H04N 1/00864; H04N 1/0084
USPC ................. 358/1.9, 2.1, 3.24, 3.28, 500, 501, 358/518–521, 526, 530, 443, 448, 470; 382/100, 162, 167; 283/72, 113, 114, 283/901, 902
See application file for complete search history.

(56) References Cited

U.S. PATENT DOCUMENTS 5,973,802 A 10/1999 Hirota et al.
7,027,088 B1 4/2006 Kuwata et al.
(Continued)

FOREIGN PATENT DOCUMENTS

CN 1627208 A 6/2005
CN 101184144 A 5/2008
(Continued)

OTHER PUBLICATIONS

International Preliminary Report on Patentability dated May 5, 2011 in International Application No. PCT/JP2010/004341.

(Continued)

*Primary Examiner* — Benny Q Tieu
*Assistant Examiner* — Quyen V Ngo
(74) *Attorney, Agent, or Firm* — Fitzpatrick, Cella, Herper & Scinto (57) ABSTRACT

An image processing apparatus determines whether a color image is formed by reading an original with a reading unit or input from an external apparatus, and sets a conversion method for converting the color image into a monochrome image such that when an image obtained by monochrome converting the color image is output onto a recording medium, security information included in the color image is difficult to be discriminated by human eyes, if the color image is formed by reading an original. If the color image is input from the external apparatus, the image processing apparatus sets a monochrome conversion method selected by a user. The apparatus then converts the color image into a monochrome image by the set monochrome conversion method.

12 Claims, 12 Drawing Sheets

(56) References Cited

U.S. PATENT DOCUMENTS

| | | | |
|---|---|---|---|
| 7,131,775 B2 | 11/2006 | Uchida et al. | |
| 7,298,527 B2 | 11/2007 | Yabe | |
| 7,751,085 B2 | 7/2010 | Yabe | |
| 8,189,212 B2 | 5/2012 | Uchida et al. | |
| 8,189,235 B2* | 5/2012 | Matsuzaki | 358/2.1 |
| 8,422,081 B2 | 4/2013 | Park et al. | |
| 2002/0018228 A1* | 2/2002 | Torigoe | 358/1.14 |
| 2005/0068586 A1 | 3/2005 | Sano | |
| 2006/0050330 A1* | 3/2006 | Tanimoto et al. | 358/474 |
| 2006/0072158 A1* | 4/2006 | Christie | 358/3.01 |
| 2006/0159338 A1* | 7/2006 | Nako et al. | 382/167 |
| 2008/0024844 A1 | 1/2008 | Yabe | |
| 2008/0117466 A1* | 5/2008 | Park et al. | 358/3.03 |
| 2009/0284768 A1 | 11/2009 | Yabe | |

FOREIGN PATENT DOCUMENTS

| | | |
|---|---|---|
| EP | 1924076 | 5/2008 |
| JP | 8-251427 | 9/1996 |
| JP | 2000-105820 A | 4/2000 |
| JP | 2003-283848 | 10/2003 |
| JP | 2004-120562 | 4/2004 |
| JP | 2005-012623 | 1/2005 |
| JP | 2006-185457 | 7/2006 |
| JP | 2008-205906 | 9/2008 |

OTHER PUBLICATIONS

European Search Report dated Jul. 29, 2013 from EP Appl No. 10796884.4.

Chinese Office Action dated Jan. 6, 2014 for Chinese Patent Appln No. 201080030686.9.

* cited by examiner

| | R2,G2,B2 | | | ND1 (LUMINANCE) | | | ND2 (DENSITY) | | |
|---|---|---|---|---|---|---|---|---|---|
| | R2 | G2 | B2 | sRGB | NTSC | EQUIVALENCE | sRGB | NTSC | EQUIVALENCE |
| RED | 255 | 0 | 0 | 54 | 80 | 85 | 107 | 80 | 76 |
| GREEN | 0.00 | 255.00 | 0.00 | 184 | 143 | 85 | 23 | 40 | 76 |
| BLUE | 0.00 | 0.00 | 255.00 | 18 | 32 | 85 | 183 | 144 | 76 |
| YELLOW | 255.00 | 255.00 | 0.00 | 237 | 223 | 170 | 5 | 9 | 28 |
| MAGENTA | 255.00 | 0.00 | 255.00 | 71 | 112 | 170 | 88 | 57 | 28 |
| CYAN | 0.00 | 255.00 | 255.00 | 201 | 175 | 170 | 16 | 26 | 28 |
| WHITE | 255.00 | 255.00 | 255.00 | 255 | 255 | 255 | 0 | 0 | 0 |
| BLACK | 0.00 | 0.00 | 0.00 | 0 | 0 | 0 | 255 | 255 | 255 |

FIG. 6A

COLOR INPUT IMAGE

FIG. 6B

MONOCHROME OUTPUT OF sRGB SETTING

FIG. 6C

MONOCHROME OUTPUT OF EQUIVALENCE SETTING

FIG. 7A

COLOR INPUT IMAGE

FIG. 7B

MONOCHROME OUTPUT OF sRGB SETTING

FIG. 7C

MONOCHROME OUTPUT OF EQUIVALENCE SETTING

FIG. 9

FIG. 10A
COLOR INPUT IMAGE

FIG. 10B
ISOLATED POINT DISCRIMINATION IMAGE

FIG. 10C
MONOCHROME OUTPUT

FIG. 11

IMAGE PROCESSING APPARATUS AND METHOD FOR CONVERTING A COLOR IMAGE INTO A MONOCHROME IMAGE

TECHNICAL FIELD

The invention relates to an image processing apparatus, an image processing method, and a program for performing a monochrome conversion of image data.

BACKGROUND ART

In recent years, in a printer market, the printer has been being shifted from a monochrome printer to a color printer. However, a price of a color print or a color copy is still high and it is a present situation that a color original is often copied or printed as a black-and-white image.

Among them, when the color original is copied or printed in black and white or a monochromatic color, generally, the original read by a reader constructed by a plurality of channels of red, green, and blue is image processed into one black channel. A process for converting the read color image into the black channel is hereinbelow called "color/monochrome conversion".

With respect to the color/monochrome conversion, a method whereby a color original is separated into characters, an image, and a background and is converted into a color monochrome image so that only the characters can be easily read has been disclosed in the Official Gazette of Japanese Patent Application Laid-Open No. 2003-283848. Specifically speaking, luminance of monochrome character data is compared with luminance of either monochrome image data or monochrome background data, thereby obtaining a luminance difference. A method whereby when such a luminance difference is equal to or less than a predetermined value, the luminance of the monochrome character data is changed in such a direction as to increase the luminance difference has also been disclosed.

In the ordinary color/monochrome conversion, there is such a problem that when a character drawn in yellow in the color original is copied or printed as a black-and-white image, the obtained character becomes difficult to be seen. Therefore, a blend ratio of the read signals of red, green, and blue is set to a blend ratio in which reproducibility of a yellow pixel is high, thereby improving the reproducibility of the yellow pixel at the time when the yellow pixel is converted into a monochrome pixel.

However, In the color/monochrome conversion in which the reproducibility of the yellow pixel has been improved, there is such a problem that invisible yellow security information embedded in a copied matter is visualized by the monochrome copy. It is undesirable that the yellow security information is visualized by the copy.

In the Official Gazette of Japanese Patent Application Laid-Open No. 2003-283848, a countermeasure for solving such a problem that the yellow security information included in the original is reproduced by the monochrome copy is not disclosed.

To solve the foregoing problem, therefore, it is an object of the invention to provide image processing apparatus and method in which when an original including security information is read by a reading unit and is monochrome converted, such a monochrome output that the security information is not visualized can be performed.

CITATION LIST

Patent Literature

PTL 1: Japanese Patent Application Laid-Open No. 2003-283848

SUMMARY OF INVENTION

To accomplish the above object, the present invention provides an image processing apparatus for converting a color image into a monochrome image, having a reading unit for reading an original. The apparatus comprises:
determining means for determining whether a color image is formed by reading an original with the reading unit or input from an external apparatus;
setting means for setting a conversion method for converting the color image into a monochrome image in such a manner that when an image obtained by monochrome converting the color image is output onto a recording medium, security information included in the color image is difficult to be discriminated by human eyes, if the determining means determines that the color image is formed by reading an original with the reading unit, wherein the setting means sets a monochrome conversion method selected by a user, if the determining means determines that the color image is input from an external apparatus; and
converting means for converting the color image into a monochrome image by the conversion method set by the setting means.

According to the invention, when the original including the security information is read by the reading unit, a monochrome converted image is formed, and the formed image is output onto a recording medium, a monochrome output can be performed so that the security information becomes difficult to be discriminated by the human eyes.

Another object of the invention is to provide a novel function. To accomplish the above objects, further features of claims and the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Embodiments for carrying out the invention will be described hereinbelow by using the drawings.

First Embodiment

Figure 1:
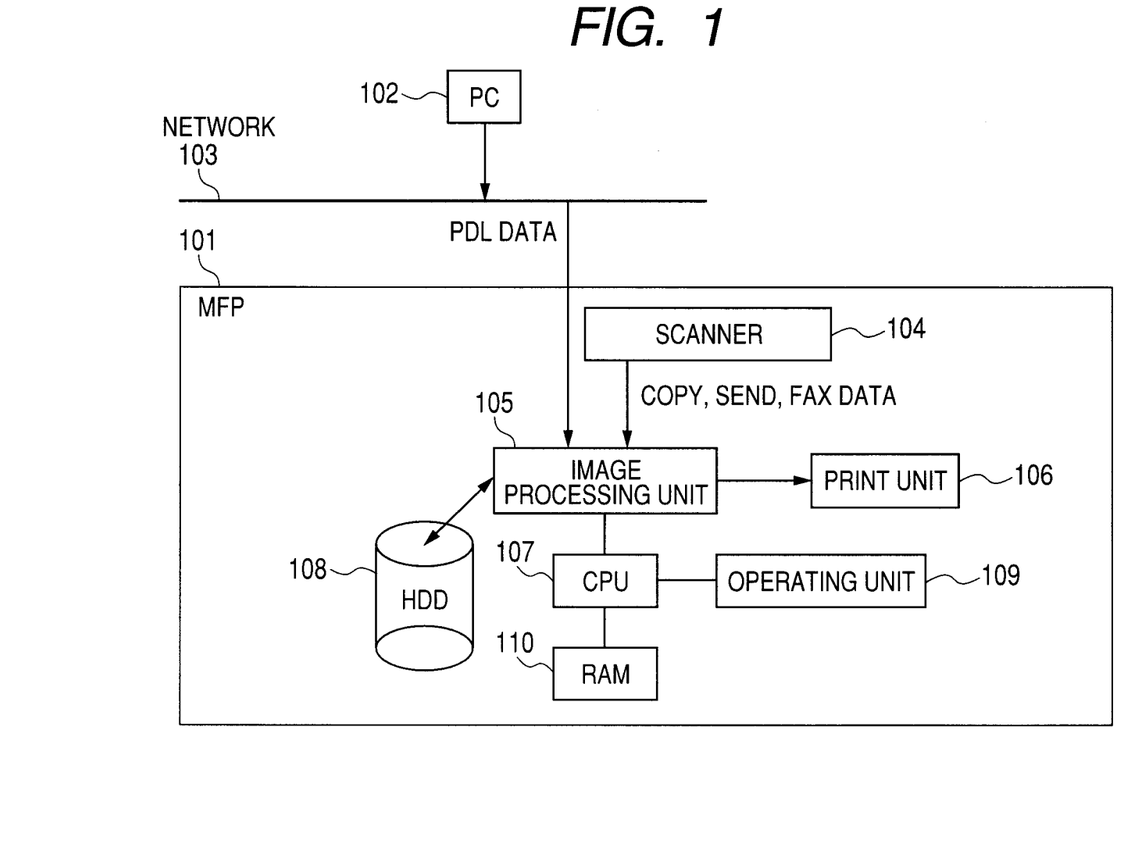
FIG. 1 is a block diagram of an embodiment.
Figure 3:
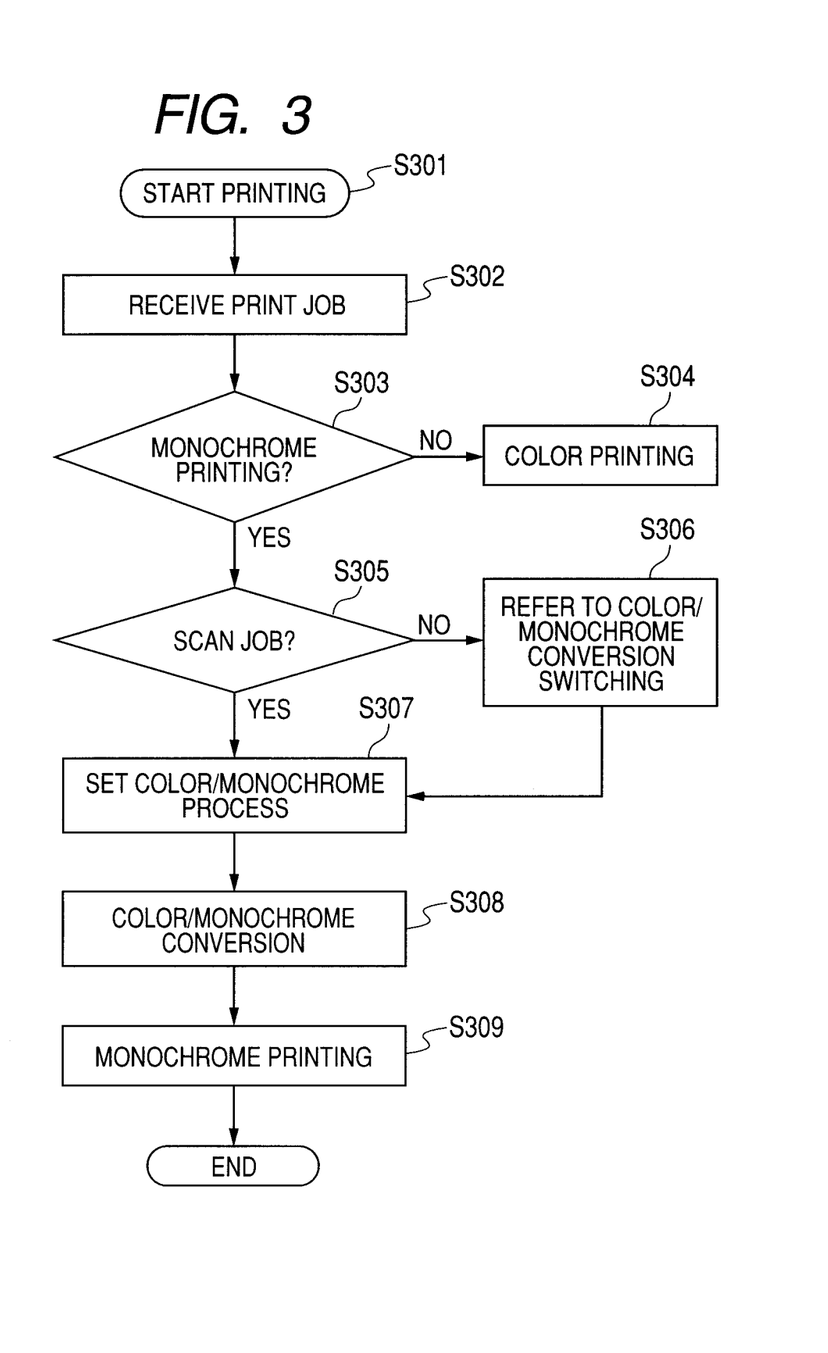
FIG. 3 is a flowchart of the first embodiment.

A first embodiment of the invention will be described by using FIG. 1 and a flowchart of FIG. 3. FIG. 1 illustrates a construction of an MFP (Multi Function Peripheral) 101 which can execute image processes in the embodiment and a PC (Personal Computer) 102. FIG. 3 is a flowchart illustrating a flow for processes in the embodiment. A program for realizing the flowchart of FIG. 3 has been stored in an HDD 108. The stored program is readout into a RAM 110 and a CPU executes the program, so that the flowchart of FIG. 3 is executed.

FIG. 1 will be described. In FIG. 1, the MFP 101 and the PC 102 are connected through a network 103. The MFP 101 is constructed by a scanner 104, an image processing unit 105, a print unit 106, a CPU 107, the HDD 108, an operating unit 109, and the RAM 110.

Subsequently, FIG. 3 will be described. First, a case where data of a page description language (hereinbelow, abbreviated to PDL) is transmitted from the PC to a printer and printed by the printer will be described.

First, in S301 in FIG. 3, by instructing the printing from a UI (User Interface) (not shown) of the PC 102 in FIG. 1, the print start is instructed. When the printing is instructed in S301, the PDL data stored in the PC 102 is sent to the image processing unit 105 via the network 103. Subsequently, in S302, the PDL data is received as a print job. In S303, the PDL data is interpreted and whether or not the data is monochrome printed is discriminated. If it is determined in S303 that the data is not monochrome printed, S304 follows and the data is color printed. If it is determined in S303 that the data is monochrome printed, S305 follows and it is determined whether the data is for a scan job (job formed by reading the original by the scanner 104) or PDL data by referring to an attribution flag attached to the print job received in S302.

Figure 4:
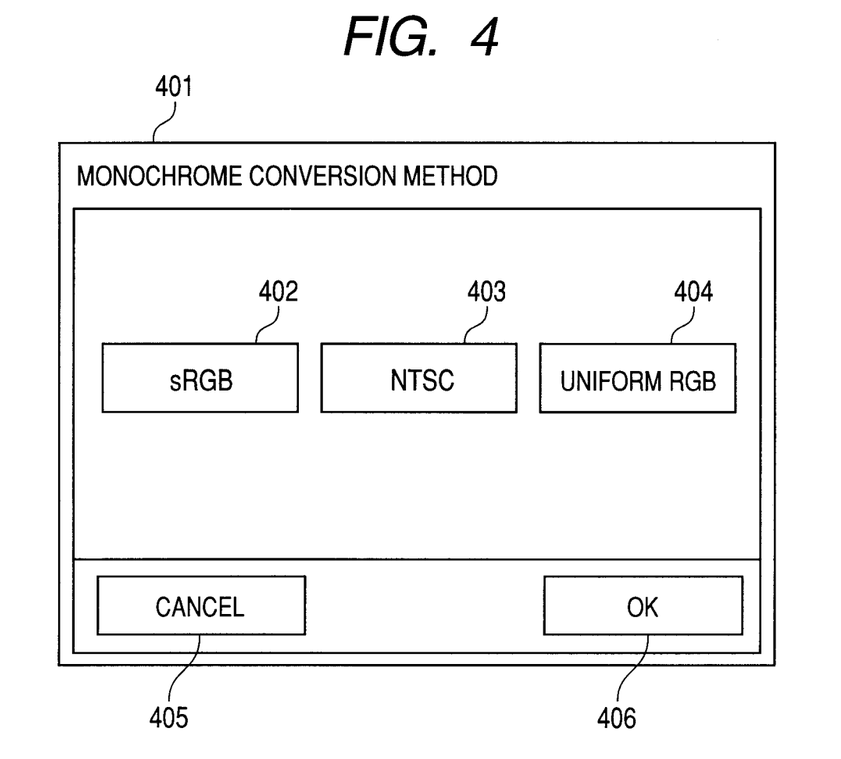
FIG. 4 is an operating unit 109 of the embodiment.

In this case, since the data is not the scan job because of the PDL, the processing routine advances to a color/monochrome conversion switching reference in S306. The setting of a color/monochrome conversion method illustrated in FIG. 4 is referred to. Generally, it has been set to sRGB and, in S307, the following equation (1) is set so that a color/monochrome converting process for sRGB is executed by using the equation (1).

$$ND1 = 0.21 \times R2 + 0.72 \times G2 + 0.07 \times B2 \tag{1}$$

In S306, the conversion method of the color/monochrome conversion can be selected from sRGB 402, NTSC 403, and uniform RGB 404 by using a UI 401 in FIG. 4. When sRGB 402 is selected, the color/monochrome conversion of the sRGB conversion method is executed by using the equation (1). When NTSC 403 is selected, the color/monochrome conversion of the NTSC conversion method is executed by using the following equation (2). When uniform RGB 404 is selected, the color/monochrome conversion of the uniform RGB method is executed by using the following equation (3).

$$ND1 = 0.3125 \times R2 + 0.5625 \times G2 + 0.1250 \times B2 \tag{2}$$

$$ND1 = (R2 + G2 + B2)/3 \tag{3}$$

Subsequently, in S308, the color/monochrome conversion is executed. In S309, the monochrome printing is executed by using the monochrome converted signal.

Figure 2:
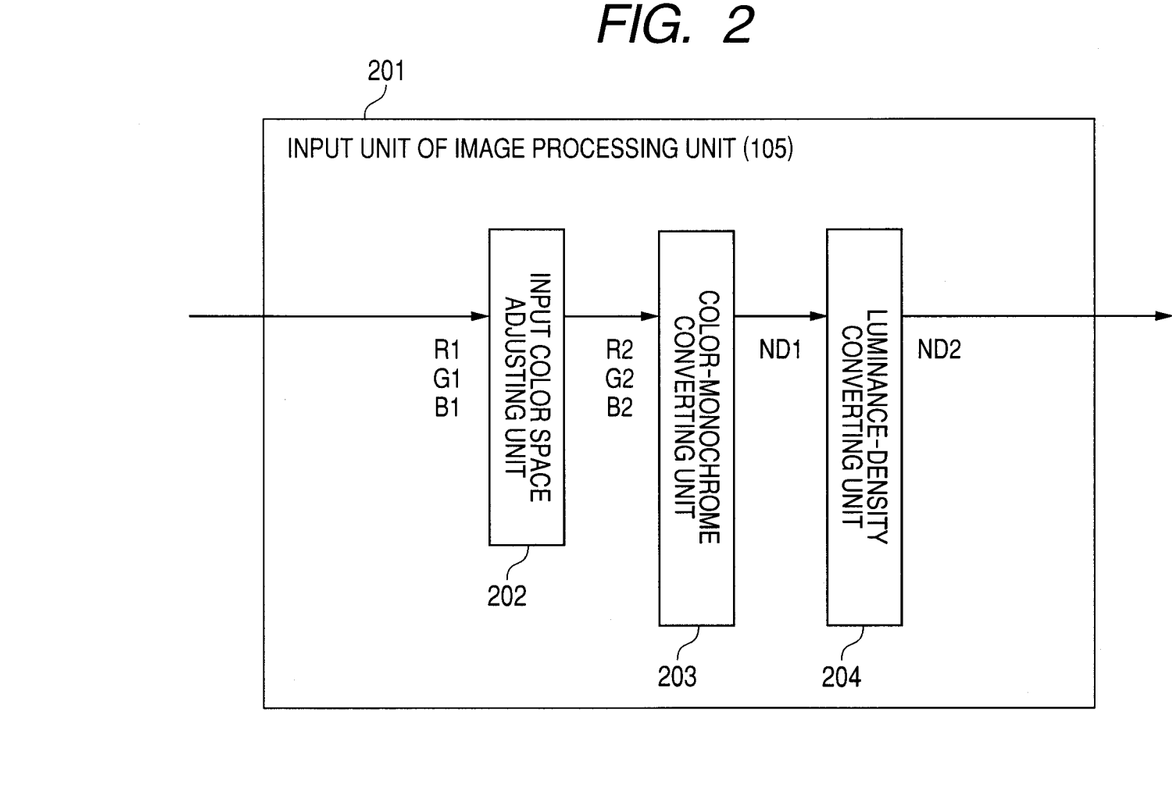
FIG. 2 is a block diagram of an image processing unit 105 in the embodiment.
Figure 5:
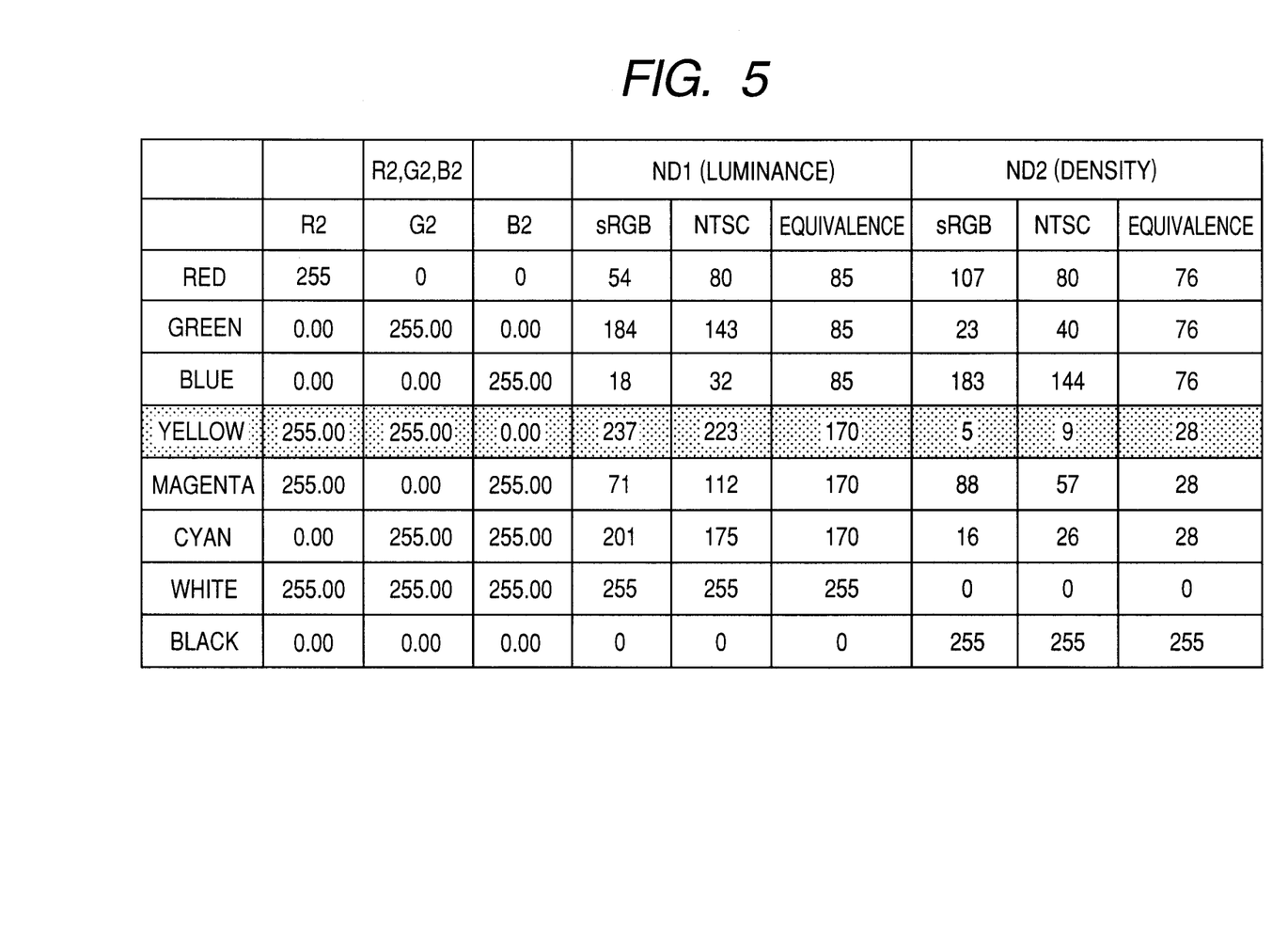
FIG. 5 is a diagram illustrating a change in color/monochrome converted data in the embodiment.

The color/monochrome conversion which is executed in S308 in FIG. 3 will be described by using FIG. 2. First, an input color space adjustment is executed in an input color space adjusting unit 202 according to a color space of the color data which was input. If the color space of the input color data is sRGB, it is sufficient to send the color data as it is to the next process in a state of sRGB. Therefore, the data is transferred to a color-monochrome converting unit 203 without executing the process in the input color space adjusting unit 202. The color-monochrome converting unit 203 converts the RGB signal (R2, G2, B2) output from the input color space adjusting unit 202 into a monochrome ND1 signal by using the equation (1). Although a case of one channel signal of ND1 will be described here because of the monochrome conversion, there is also a method whereby the process is executed by a plurality of signals on the assumption that R=G=B and they are finally converted into one channel. FIG. 5 illustrates values in which ND1 (luminance) has been calculated by a signal conversion from the RGB signal (R2, G2, B2) output from the input color space adjusting unit 202.

In FIG. 5, for example, (R, G, B)=(255, 255, 0) of yellow is converted into 237 by the equation (1). Subsequently, in order to print, the signal is converted from a luminance signal into a density signal in a luminance-density converting unit 204. For example, the luminance signal output from the color-monochrome converting unit 203 is converted into the density signal by using the following equation (4).

$$ND2 = -255/1.60 \times \text{LOG} 10(ND1/255) \tag{4}$$

Specifically speaking, a signal conversion from an input signal ND1 into an output signal ND2 is executed. Although a case of one channel signal of ND2 will be described here as a monochrome conversion, there is also a method whereby the process is executed by a plurality of signals on the assumption that C=M=Y and they are finally converted into one channel.

It will be understood that the value of ND1 converted from (R2, G2, B2) and the value of ND2 differ depending on each conversion method of the sRGB conversion method, NTSC conversion method, or the uniform RGB conversion method which has been set from the UI 401 in FIG. 4. For example, if yellow dots are color/monochrome converted by the sRGB conversion method, an output density value of the dots is equal to 5. If the yellow dots are color/monochrome converted by the NTSC conversion method, an output density value of the dots is equal to 9 and the dots of very small density are derived. If the yellow dots are color/monochrome converted by the uniform RGB conversion method, an output density value of the signal of the yellow dots which were difficult to be seen is equal to 28. It will be understood that the density is about three times as large as that in the NTSC conversion method.

Figure 6A:
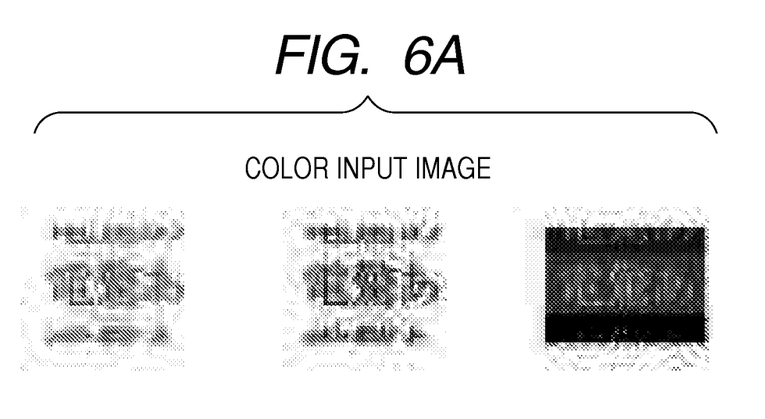
FIG. 6A is an example of a color input image and a monochrome output image in the embodiment.
Figure 6B:
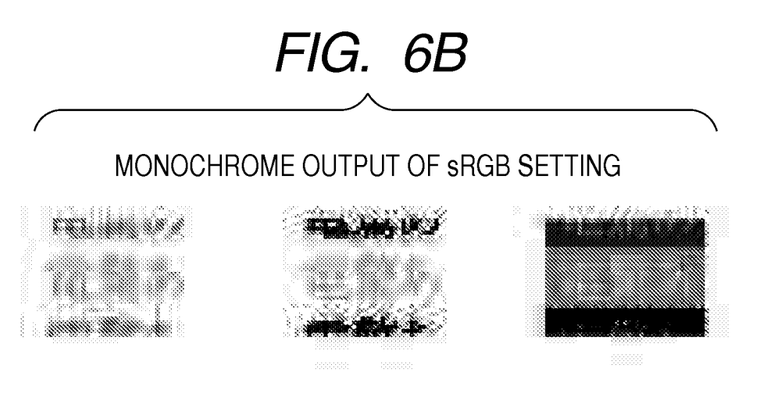
FIG. 6B is an example of a color input image and a monochrome output image in the embodiment.
Figure 6C:
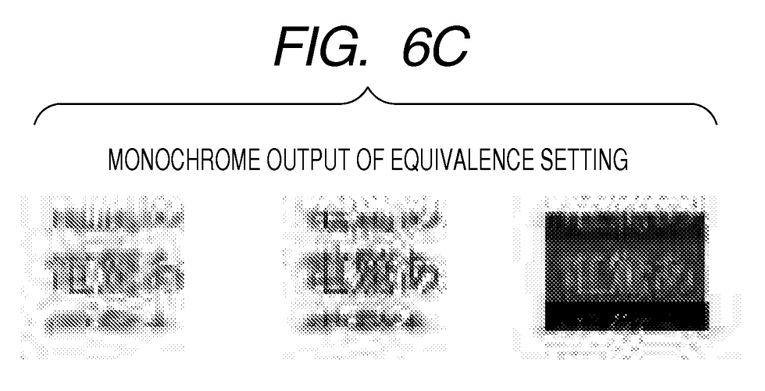
FIG. 6C is an example of a color input image and a monochrome output image in the embodiment.

As an actual printing, yellow characters of an input color signal (R1, G1, B1)=(255, 255, 0) in FIG. 6A become ND1=170 (luminance signal) by the color/monochrome conversion of the uniform RGB conversion method in FIG. 6C. On the other hand, they become ND1=237 (luminance signal) by the color/monochrome conversion of the sRGB conversion method in FIG. 6B. It will be understood that if the monochrome conversion is performed by using the equivalence setting of FIG. 6C, the yellow dots become darker and have been reproduced more darkly as compared with the case where the monochrome conversion is performed by using the sRGB setting of FIG. 6B.

Subsequently, a case where the original is read by the scanner (reading unit) and is subjected to a copying process, a sending process, or a FAX transmission will be described. First, in S301 in FIG. 3, an instruction to scan the original and perform the printing is made from a UI (User Interface) of the operating unit 109 in FIG. 1. When the instruction is made, the scanner 104 reads the original and data of the original is sent to the image processing unit 105 in FIG. 1. In S302, the original data is received as a print job. In S303, it is determined whether the received job is a job for performing the monochrome printing or the color printing by referring to an attribution flag attached to the print job received in S302. If the received job does not designate the monochrome printing but designates the color printing, the color printing is executed in S304. If it is determined in S303 that the received job is the job for performing the monochrome printing, it is determined in S305 whether the received job is a scan job or a job for PDL data received from a PC (external apparatus) by referring to the attribution flag attached to the print job received in S302. Since the present job is a job read by the scanner, the processing routine advances to S307. In S307, a predetermined color/monochrome conversion equation is set. The predetermined color/monochrome conversion equation is, for example, the color/monochrome conversion equation for sRGB described in the equation (1). In S307, a conversion equation for converting a color image including security information into a monochrome image is set in such a manner that when an image obtained by monochrome converting the security information (for example, yellow dots) is output onto a recording medium, the security information is difficult to be discriminated by the human eyes.

Subsequently, in S308, the color/monochrome conversion is executed by using the color/monochrome conversion equation set in S307. In S309, the monochrome printing is performed by using the monochrome converted signal. The color/monochrome conversion which is executed in S308 in FIG. 3 will now be described by using FIG. 2. First, the input color space adjustment is executed in the input color space adjusting unit 202 according to a color space of the color data which was input. If the color space of the input color data is sRGB, it is sufficient to send the color data as it is to the next process in a state of sRGB. Therefore, the data is transferred to the color-monochrome converting unit 203 without executing the process in the input color space adjusting unit 202. The color-monochrome converting unit 203 converts the RGB signal (R2, G2, B2) output from the input color space adjusting unit 202 into the monochrome ND1 signal by using the equation (1). For example, (R, G, B)=(255, 255, 0) of yellow is converted into 237 by the equation (1). Subsequently, in order to print, the signal is converted from the luminance signal into the density signal in the luminance-density converting unit 204. For example, the luminance signal output from the color-monochrome converting unit 203 is converted into the density signal by using the equation (4). Specifically speaking, the signal conversion from the input signal ND1 into the output signal ND2 is executed.

If the input job is the scan job, the yellow dots in the original are converted by the color/monochrome conversion of sRGB, so that an output density value of the dots is equal to 5. It will be understood that the signal becomes a signal of very small density (the larger its value is, the darker the image is).

Figure 7A:
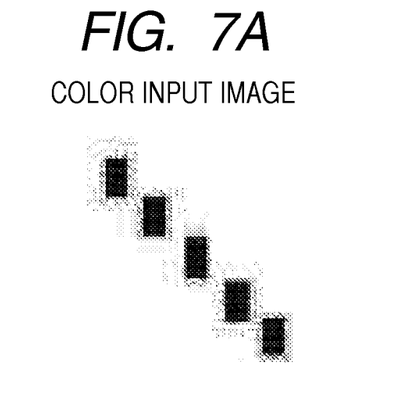
FIG. 7A is an example of a color input image and a monochrome output image in the embodiment.
Figure 7B:
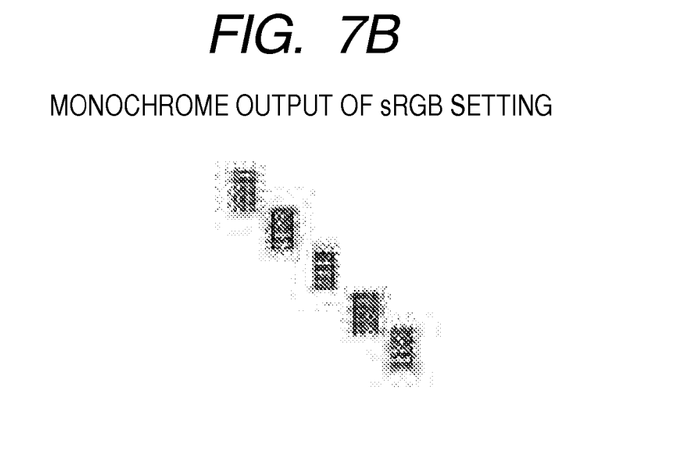
FIG. 7B is an example of a color input image and a monochrome output image in the embodiment.
Figure 7C:
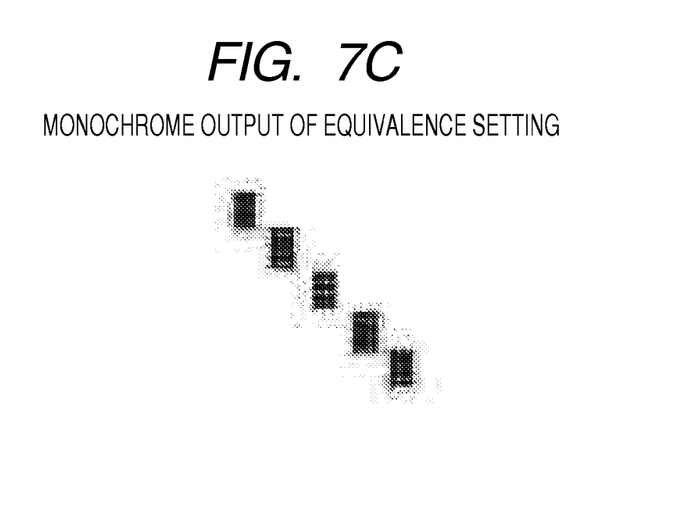
FIG. 7C is an example of a color input image and a monochrome output image in the embodiment.

As an actual printing, invisible yellow dots of an input color signal (R1, G1, B1)=(255, 255, 0) in FIG. 7A are converted into dots of ND1=237 (luminance signal) as illustrated in FIG. 7B by the color/monochrome conversion of the sRGB setting. The converted dots are thinly reproduced and become difficult to be seen. Therefore, it will be understood that even if a color image added with yellow dots is converted into a monochrome image, invisibility of the yellow dots can be maintained. On the other hand, in the case of a PDL job, RGB equivalence can be selected as a color/monochrome conversion equation. If the color/monochrome conversion was executed to the yellow dots by using the color/monochrome conversion equation of RGB equivalence, the invisible yellow dots are converted into dots of ND1=170 (luminance signal) as illustrated in FIG. 7C. It will be understood that the converted dots become darker and more conspicuous than those in the case of the sRGB setting, the dots are seen due to the monochrome conversion, and picture quality deteriorates.

In the embodiment, when the input job is the PDL data, the color/monochrome conversion method can be selected from the RGB conversion method, NTSC conversion method, and uniform RGB conversion method. However, the input job is the scan job, the color/monochrome conversion is executed by the sRGB conversion method and another color/monochrome conversion method cannot be selected.

This is because in the case of the PDL data, since the yellow security dots which are not intended to be visualized by the monochrome conversion are not included in the PDL data, even if the monochrome conversion is executed by any one of the color/monochrome conversion methods, the yellow dots are not visualized. However, in the case of the scan job, since there is a possibility that the yellow security dots are included in the read original, it is desirable that the color/monochrome conversion is executed by the sRGB conversion method in which the yellow dots are not visualized by the color/monochrome conversion. In the case of the scan job, if the color/monochrome conversion is executed by using the uniform RGB conversion method, the yellow security dots included in the original are visualized as mentioned above.

If the yellow security dots included in the original are not visualized by the color/monochrome conversion, the color/monochrome conversion method other than the sRGB conversion method may be used.

In the embodiment, the apparatus has a plurality of monochrome conversion methods which are used when the color image is converted into a monochrome image and in which blend ratios of the RGB components of the color image are different. The plurality of monochrome conversion methods are, for example, the monochrome conversion method for sRGB of the equation (1), the monochrome conversion method for NTSC of the equation (2), and the monochrome conversion method for uniform RGB of the equation (3). Whether the color image is an image formed by reading the original by the reading unit or an image (for example, PDL, PDF, or PS data) input from an external apparatus is discriminated. If it is determined that the color image is the image formed by reading the original by the reading unit, the monochrome conversion method (for example, the monochrome conversion method for sRGB) in which a ratio of the B component is smaller than that in each of the other monochrome conversion methods is set from the plurality of monochrome conversion methods. If it is determined that the color image is the image input from the external apparatus, the monochrome conversion method (for example, the NTSC conversion method or the uniform RGB conversion method) in which the ratio of the B component is larger than that in each of the other monochrome conversion methods is set from the plurality of monochrome conversion methods. When the color image has been input from the external apparatus, the sRGB conversion method can be also set.

According to the method of the first embodiment mentioned above, the color/monochrome conversion is performed to the image data obtained by scanning the original by using the monochrome conversion method in which the yellow dots are not visualized and it is converted into the monochrome image, so that the visualization of the monochrome dots converted from the yellow dots can be prevented. The plurality of monochrome conversion methods can be selected for the PDL job. For example, if the RGB equivalence method is selected by the user, yellow characters or a yellow object which is difficult to be seen in the color original is visualized in the monochrome image so that it can be easily seen.

Second Embodiment

In the first embodiment, when the original is scanned, the color/monochrome conversion method in the color-monochrome converting unit 203 has been fixed to the sRGB conversion method for all images. In the second embodiment, the color/monochrome conversion method is fixed to the sRGB conversion method only for the yellow isolated pixels and the color/monochrome conversion method is enabled to be selected for the pixels other than the yellow isolated pixels. Thus, for example, by monochrome converting the pixels other than the yellow isolated pixels by the RGB equivalence method, the dark dots can be formed in the monochrome image and the deterioration in picture quality can be reduced.

Figure 8:
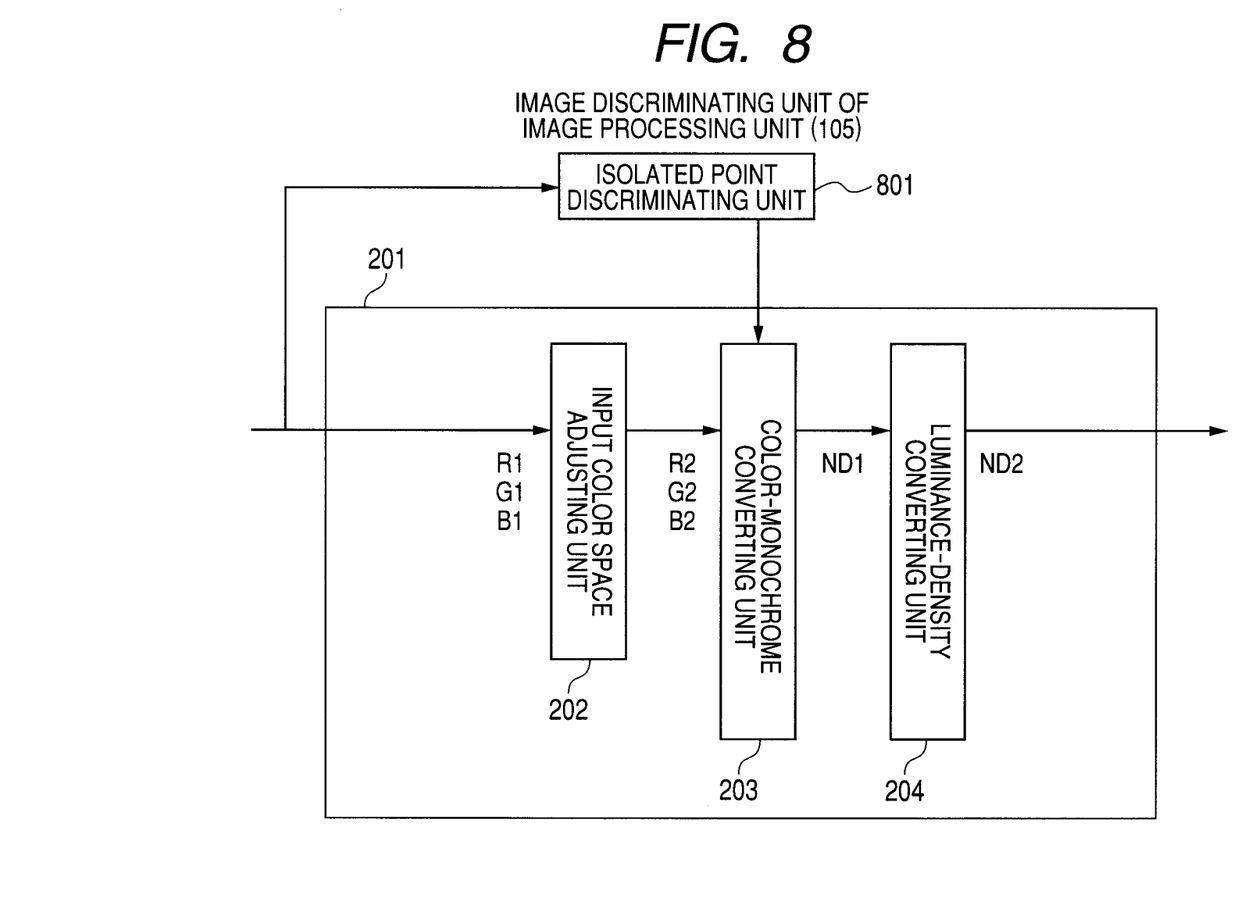
FIG. 8 is a block diagram of the image processing unit 105 in the second embodiment.

A construction of the image processing unit 105 in the second embodiment is illustrated in FIG. 8. In FIG. 8, an isolated point discriminating unit 801 is added to the construction of the image processing unit 105 in FIG. 2. In the isolated point discriminating unit 801, yellow isolated dots are detected from the input image signal. Pixel positions of the isolated dots detected in the isolated point discriminating unit 801 are input to the color-monochrome converting unit 203. In the color-monochrome converting unit 203, the color/monochrome conversion is executed to the yellow isolated pixels by using the sRGB conversion method. Thus, the yellow dots can be made to be difficult to be seen.

Figure 10A:
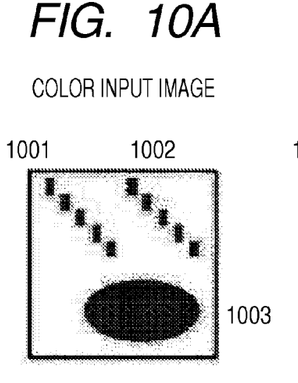
FIG. 10A is an example of a color input image and a monochrome output image in the second embodiment.
Figure 10B:
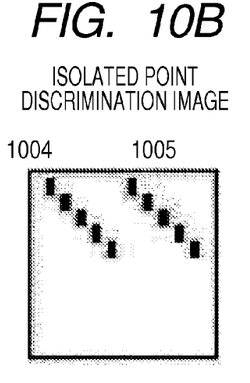
FIG. 10B is an example of a color input image and a monochrome output image in the second embodiment.

An isolated point detecting method which has been used in the related art is used for the discrimination of the yellow isolated dots in the isolated point discriminating unit 801. For example, whether or not a target pixel is yellow is discriminated and, subsequently, it is detected that there are no yellow pixels near the target pixel, thereby enabling the yellow isolated dots to be discriminated. Isolated points 1001 and 1002 in a color input image of FIG. 10A can be detected by the isolated point discriminating unit 801. In the isolated point discriminating unit 801, an isolated point discrimination image of FIG. 10B is formed and portions of the isolated points are reproduced in black and other portions are reproduced in white.

Figure 9:
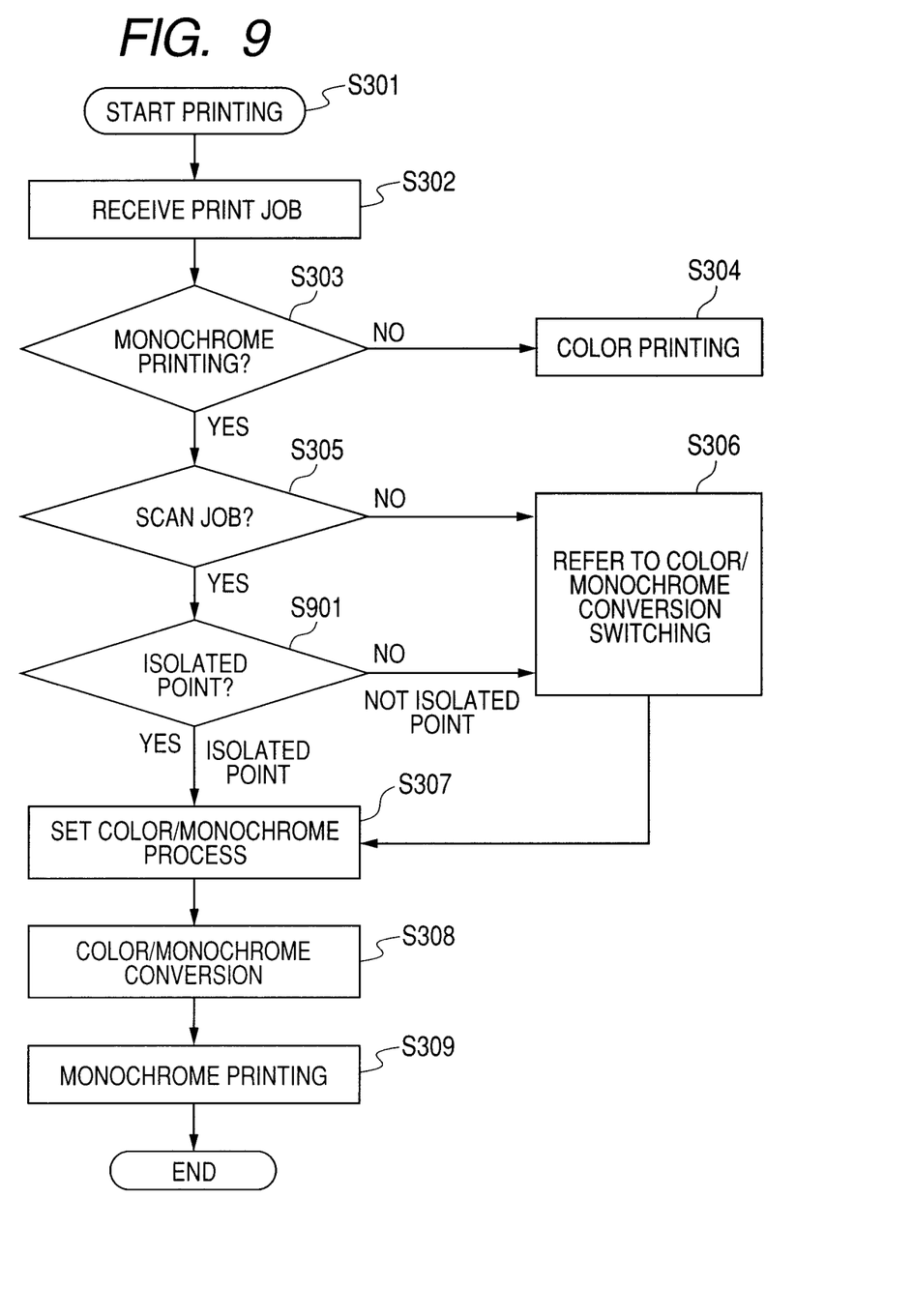
FIG. 9 is a flowchart of the second embodiment.

FIG. 9 is a flowchart constructed by adding the isolated point discrimination to the flowchart of FIG. 3 of the first embodiment. This flowchart differs from the flowchart of FIG. 3 with respect to a point that the isolated point discrimination of S901 is added. FIG. 9 is the flowchart illustrating a flow for processes in the second embodiment. A program for realizing the flowchart of FIG. 9 has been stored in the HDD 108. The stored program is read out into the RAM 110 and the CPU executes the program, so that the flowchart of FIG. 9 is executed.

Figure 10C:
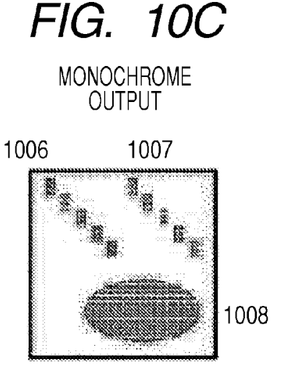
FIG. 10C is an example of a color input image and a monochrome output image in the second embodiment.

Since processes of S301 to S309 in FIG. 9 are similar to the processes of S301 to S309 in FIG. 3, their description is omitted. In S901 in FIG. 9, the isolated point is discriminated in the isolated point discriminating unit 801. If the isolated point exists, position information of the isolated point is stored into the RAM 110 and the processing routine advances to S307. If the isolated point does not exist, S306 follows. In the isolated point discrimination in S901, the isolated point discrimination image illustrated in FIG. 10B is formed and the black pixel in the isolated point discrimination image is determined as an isolated point. If it is decided in S901 that the isolated point exists, the sRGB conversion method is set for the pixel of the isolated point in S307. The color/monochrome conversion of the sRGB conversion method is executed in S308. By the monochrome conversion of the sRGB conversion method, density of the pixel of the isolated point becomes thin and becomes difficult to be visualized. To the pixels determined to be not the isolated points (pixels other than the isolated point) (for example, ellipse 1003 in FIG. 10A), the color/monochrome conversion method selected by the user from the plurality of color/monochrome conversion methods is applied. For example, if the RGB equivalence method was selected with reference to the color/monochrome conversion method in S306, a portion 1008 of the ellipse is reproduced at large density as illustrated in FIG. 10C.

As mentioned above, according to the second embodiment, as a result of the monochrome conversion, the pixel of the yellow isolated dot can be converted so as to be difficult to be seen (the density is small) and the pixel of the other yellow object can be converted so as to be easily seen (the density is large).

Since there are a variety of security dots in the companies, by registering their patterns, invisible dots can be also made to be certainly difficult to be seen.

Third Embodiment

Figure 11:
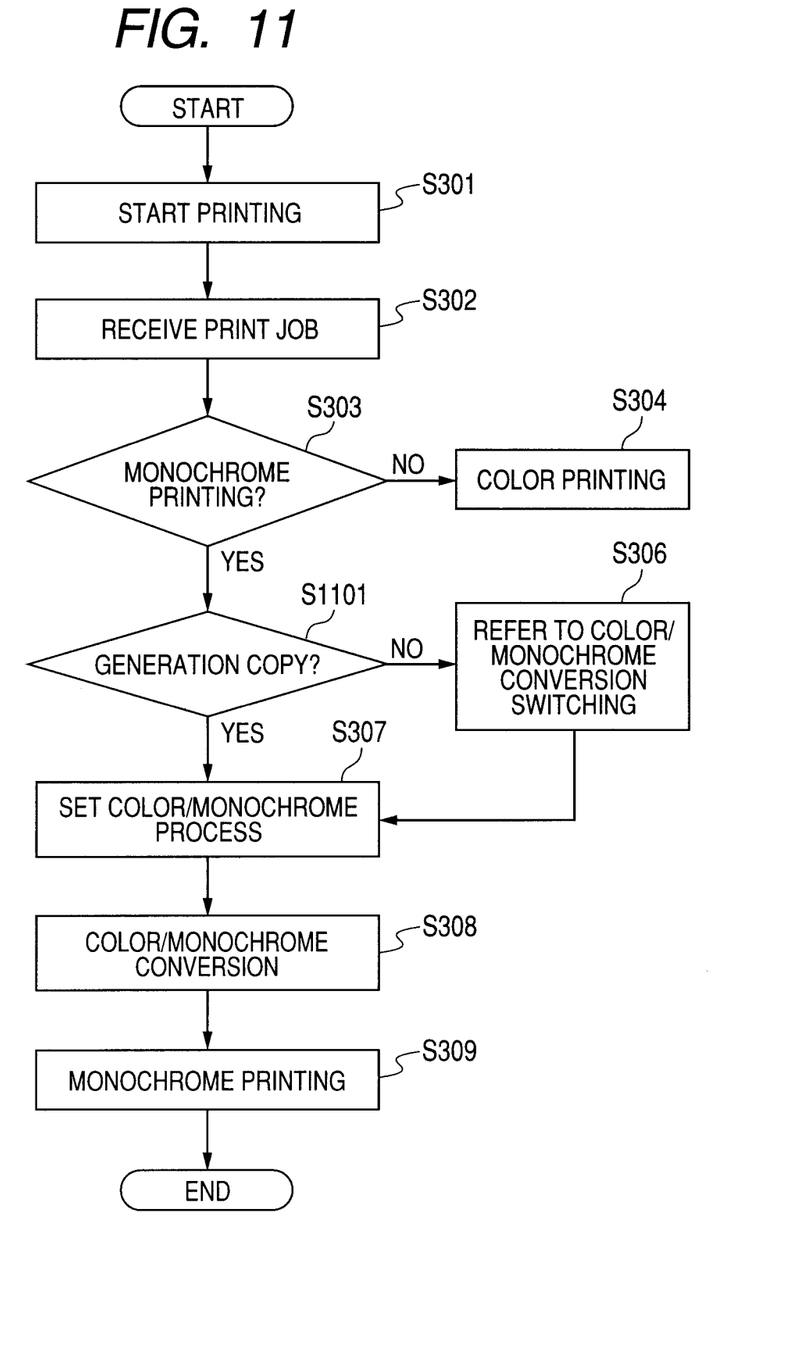
FIG. 11 is a flowchart of the third embodiment.

FIG. 11 is a flowchart constructed by adding a generation copy discrimination of S1101 to the flowchart of FIG. 3 of the first embodiment. This flowchart differs from the flowchart of FIG. 3 with respect to a point that the generation copy discrimination of S1101 is added in place of S305 in FIG. 3. FIG. 11 is the flowchart illustrating a flow for processes in the third embodiment. A program for realizing the flowchart of FIG. 11 has been stored in the HDD 108. The stored program is read out into the RAM 110 and the CPU executes the program, so that the flowchart of FIG. 11 is executed.

Since processes of S301 to S304 and S306 to S309 in FIG. 11 are similar to the processes of S301 to S304 and S306 to S309 in FIG. 3, their description is omitted. In S1101 in FIG. 11, by referring to the mode set by an original mode setting 1201 in the operating unit 109, whether or not the mode is a generation copy mode is discriminated. If it is determined in S1101 that the mode is the generation copy mode, S307 follows. If it is determined in S1101 that the mode is not the generation copy mode, S306 follows.

The "generation copy mode" used here denotes a mode for copying a copied matter of the original. At present, in office machines, generally, the invisible dots are inserted into the copied matter from a viewpoint of security. Therefore, in the case of the generation copy mode, since a possibility that the copied matter in which the invisible dots have been inserted is copied is high, the color/monochrome conversion method is set to the sRGB conversion method so as to prevent such a situation that the invisible dots are visualized as a result of the monochrome conversion.

In S1101, the original mode is discriminated and if it is decided that the original mode is the generation copy mode, the sRGB conversion method is set in S307. The color/monochrome conversion of the sRGB conversion method is executed in S308. By the monochrome conversion of the sRGB conversion method, the density of the yellow dots decreases and the yellow dots become difficult to be visualized. If it is decided in S1101 that the original mode is not the generation copy mode, the color/monochrome conversion method selected by the user from the plurality of color/monochrome conversion methods is applied. For example, if the RGB equivalence method has been selected with reference to the color/monochrome conversion method in S306, the yellow pixels other than the invisible dots are reproduced at the large density.

Figure 12:
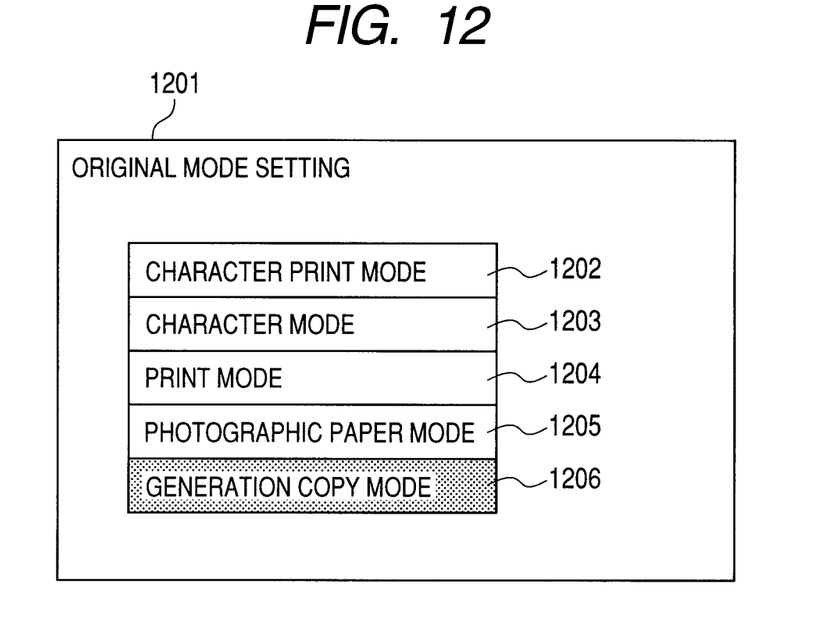
FIG. 12 is an operating unit 109 of an original mode setting of the third embodiment.

In the original mode setting 1201 in FIG. 12, a character mode 1203 is used in the case of copying an original constructed only by pencil characters. A character print mode 1202 is used in the case of copying a print halftone dot original further including characters.

Fourth Embodiment

The first, second, and third embodiments have been described with respect to the PDL data received from the outside or the data scanned by the scanner. Naturally, in the case where those data is stored in the HDD 108 and printed from the HDD 108, a similar effect is also obtained by executing processes and making a discrimination similar to those in the first, second, and third embodiments.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2009-163922, filed Jul. 10, 2009, which is hereby incorporated by reference herein in its entirety.

The invention claimed is:

1. An image processing apparatus having a reading unit for reading an original, wherein the image processing apparatus comprises:
a converting unit configured to convert a color image into a monochrome image for output of the monochrome image on a recording medium, wherein in a case where the color image is formed by reading an original with the reading unit, the converting unit converts the color image into the monochrome image using a first color-monochrome conversion method for executing conversion in such a manner that security information included in the color image is difficult to be discriminated by human eyes, and wherein in a case where the color image is formed from a job input from an external apparatus, the converting unit converts the color image into the monochrome image using a second color-monochrome conversion method selected from among a plurality of color-monochrome conversion methods via an operation unit provided in the external apparatus or in the image processing apparatus; and
an output unit configured to output the monochrome image converted by the converting unit on the recording medium.

2. An image processing apparatus according to claim 1, wherein the security information comprises yellow dots.

3. An image processing apparatus according to claim 1, wherein the first color-monochrome conversion method is an sRGB conversion method.

4. An image processing apparatus according to claim 1, wherein the second color-monochrome conversion method selected from among a plurality of color-monochrome conversion methods via the operation unit provided in the external apparatus or in the image processing apparatus is one of an NTSC conversion method, an sRGB conversion method, and a uniform RGB conversion method.

5. An image processing apparatus having a reading unit for reading an original, wherein the image processing apparatus comprises:
a converting unit configured to convert a color image into a monochrome image for output of the monochrome image, wherein in a case where the color image is formed from a job provided by reading an original with the reading unit, the converting unit converts the color image into the monochrome image using a first color-monochrome conversion method in which the ratio of the B component is smaller than those of the R component and the G component, and wherein in a case where the color image is formed from a job input from an external apparatus, the converting unit converts the color image into the monochrome image using a second color-monochrome conversion method selected from among a plurality of color-monochrome conversion methods via an operation unit provided in the external apparatus or in the image processing apparatus; and
an output unit configured to output the monochrome image converted by the converting unit.

6. An image processing method carried out in an image processing apparatus having a reading unit for reading an original, the method comprising:
converting a color image into a monochrome image for output of the monochrome image on a recording medium, wherein in a case where the color image is formed by reading an original with the reading unit, the color image is converted into the monochrome image using a first color-monochrome conversion method for executing conversion in such a manner that security information included in the color image is difficult to be discriminated by human eyes, and wherein in a case where the color image is formed from a job input from an external apparatus, the color image is converted into the monochrome image using a second color-monochrome conversion method selected from among a plurality of color-monochrome conversion methods via an operation unit provided in the external apparatus or in the image processing apparatus; and outputting the converted monochrome image on the recording medium.

7. An image processing method carried out in an image processing apparatus having a reading unit for reading an original, wherein the image processing method comprises:
converting a color image into a monochrome image for output of the monochrome image, wherein in a case where the color image is formed from a job provided by reading an original with the reading unit, the color image is converted into the monochrome image using a first color-monochrome conversion method in which the ratio of the B component is smaller than those of the R component and the G component, and wherein in a case where the color image is formed from a job input from an external apparatus, the color image is converted into the monochrome image using a second color-monochrome conversion method selected from among a plurality of color-monochrome conversion methods via an operation unit provided in the external apparatus or in the image processing apparatus; and
outputting the converted monochrome image.

8. A non-transitory computer-readable storage medium storing a computer program for causing a computer to execute the image processing method according to claim 6.

9. A non-transitory computer-readable storage medium storing a computer program for causing a computer to execute the image processing method according to claim 7.

10. An image processing apparatus comprising:
a converting unit configured to convert a color image into a monochrome image for output of the monochrome image on a recording medium, wherein in a case where the color image is formed from a job provided by reading an original with a reading unit, the converting unit converts the color image into the monochrome image using a first color-monochrome conversion method for executing conversion in such a manner that security information included in the color image is difficult to be discriminated by human eyes, and wherein in a case where the color image is formed from a job other than the job provided by reading an original with the reading unit, the converting unit converts the color image into the monochrome image using a second color-monochrome conversion method selected from among a plurality of color-monochrome conversion methods via an operation unit provided in an external apparatus or in the image processing apparatus; and
an output unit configured to output the monochrome image converted by the converting unit on the recording medium.

11. An image processing method carried out in an image processing apparatus, the method comprising:
converting a color image into a monochrome image for output of the monochrome image on a recording medium, wherein in a case where the color image is formed from a job provided by reading an original with a reading unit, the color image is converted into the monochrome image using a first color-monochrome conversion method for executing conversion in such a manner that security information included in the color image is difficult to be discriminated by human eyes, and wherein in a case where the color image is formed from a job other than the job provided by reading an original with the reading unit, the color image is converted into the monochrome image using a second color-monochrome conversion method selected from among a plurality of color-monochrome conversion methods via an operation unit provided in an external apparatus or in the image processing apparatus; and
outputting the converted monochrome image on the recording medium.

12. A non-transitory computer-readable storage medium storing a computer program for causing a computer to execute the image processing method according to claim 11.

* * * * *